(12) United States Patent
Fontenot et al.

(10) Patent No.: US 8,788,465 B2
(45) Date of Patent: Jul. 22, 2014

(54) NOTIFICATION OF CONFIGURATION UPDATES IN A CLUSTER SYSTEM

(75) Inventors: Shevaun M. Fontenot, Georgetown, TX (US); Eric P. Fried, Austin, TX (US); Rajeev Mishra, Bangalore (IN); Lance W. Russell, Rosanky, TX (US); Stephen J. Tovcimak, Red Hook, NY (US); Murali Vaddagiri, Bangalore (IN)

(73) Assignee: International Business Machines Corporation, Armonk, NY (US)

( * ) Notice: Subject to any disclaimer, the term of this patent is extended or adjusted under 35 U.S.C. 154(b) by 423 days.

(21) Appl. No.: 12/957,853

(22) Filed: Dec. 1, 2010

(65) Prior Publication Data

US 2012/0143829 A1    Jun. 7, 2012

(51) Int. Cl.
 *G06F 17/30* (2006.01)
(52) U.S. Cl.
 USPC ........................................ 707/687
(58) Field of Classification Search
 USPC ........................................ 707/687
 See application file for complete search history.

(56) References Cited

U.S. PATENT DOCUMENTS

| | | | |
|---|---|---|---|
| 5,490,270 A | 2/1996 | Devarakonda et al. | |
| 5,553,239 A | 9/1996 | Heath et al. | |
| 5,612,865 A | 3/1997 | Dasgupta | |
| 5,666,486 A | 9/1997 | Alfieri et al. | |
| 5,870,759 A | 2/1999 | Bauer et al. | |
| 5,870,765 A | 2/1999 | Bauer et al. | |
| 5,881,316 A | 3/1999 | Chaney et al. | |
| 5,884,325 A | 3/1999 | Bauer et al. | |
| 5,898,836 A | 4/1999 | Freivald et al. | |
| 6,014,669 A | 1/2000 | Slaughter et al. | |
| 6,038,625 A | 3/2000 | Ogino et al. | |
| 6,047,332 A | 4/2000 | Viswanathan et al. | |
| 6,108,699 A | 8/2000 | Moiin | |
| 6,119,131 A | 9/2000 | Cabrera et al. | |
| 6,163,806 A | 12/2000 | Viswanathan et al. | |
| 6,219,818 B1 | 4/2001 | Freivald et al. | |
| 6,256,740 B1 | 7/2001 | Muller et al. | |
| 6,269,374 B1 | 7/2001 | Chen et al. | |
| 6,353,898 B1 | 3/2002 | Wipfel et al. | |
| 6,453,426 B1 * | 9/2002 | Gamache et al. | ............ 714/4.21 |
| 6,467,050 B1 | 10/2002 | Keung | |

(Continued)

FOREIGN PATENT DOCUMENTS

| | | | |
|---|---|---|---|
| EP | 1094651 A1 | 4/2001 | |
| EP | 1197862 A1 | 4/2002 | |

OTHER PUBLICATIONS

Ghemawat et al., "The Google File System"; SOSP '03, Oct. 19-22, 2003, Bolton Landing, New York; 15 pp.

(Continued)

*Primary Examiner* — Amresh Singh
(74) *Attorney, Agent, or Firm* — Yudell Isidore Ng Russell PLLC

(57) ABSTRACT

A second node receives a message from a first node in a cluster environment. The message includes a unique identifier of a shared data storage device including a cluster configuration database that defines membership of nodes in a cluster. In response to receiving the message, the second node attempts to find the shared data storage device. In response to finding the shared data storage device, the second node locates and reads the cluster configuration database on the shared data storage device. The second node then assimilates a cluster configuration update indicated by the cluster configuration database.

18 Claims, 7 Drawing Sheets

(56) References Cited

U.S. PATENT DOCUMENTS

| | | | |
|---|---|---|---|
| 6,662,219 | B1 | 12/2003 | Nishanov et al. |
| 6,694,459 | B1 | 2/2004 | Nyman |
| 6,748,429 | B1 | 6/2004 | Talluri et al. |
| 7,010,617 | B2 | 3/2006 | Kampe et al. |
| 7,103,616 | B1 | 9/2006 | Harmer et al. |
| 7,107,267 | B2 | 9/2006 | Taylor |
| 7,171,476 | B2 | 1/2007 | Maeda et al. |
| 7,200,626 | B1 | 4/2007 | Hoang et al. |
| 7,269,706 | B2 | 9/2007 | Agarwal et al. |
| 7,289,998 | B2 | 10/2007 | Kalos |
| 7,401,093 | B1 | 7/2008 | Hamilton et al. |
| 7,441,159 | B2 | 10/2008 | Meng et al. |
| 7,593,968 | B2 | 9/2009 | Beck |
| 7,617,257 | B2 | 11/2009 | Sathyanarayan et al. |
| 7,617,289 | B2 | 11/2009 | Srinivasan et al. |
| 8,095,753 | B1* | 1/2012 | Pandey et al. ............... 711/162 |
| 2002/0002582 | A1 | 1/2002 | Ewing et al. |
| 2002/0042693 | A1* | 4/2002 | Kampe et al. ............... 702/186 |
| 2002/0059465 | A1 | 5/2002 | Kim |
| 2004/0078455 | A1* | 4/2004 | Eide et al. ............... 709/223 |
| 2004/0088294 | A1 | 5/2004 | Lerhaupt |
| 2004/0199486 | A1 | 10/2004 | Gopinath et al. |
| 2005/0015471 | A1 | 1/2005 | Zhang et al. |
| 2005/0171927 | A1 | 8/2005 | Chan et al. |
| 2006/0100981 | A1 | 5/2006 | Jones et al. |
| 2006/0167921 | A1 | 7/2006 | Grebus et al. |
| 2006/0173932 | A1 | 8/2006 | Cortright et al. |
| 2007/0168793 | A1 | 7/2007 | Seo |
| 2007/0276833 | A1 | 11/2007 | Sen et al. |
| 2008/0052455 | A1 | 2/2008 | Ahmadian et al. |
| 2009/0172195 | A1 | 7/2009 | Risbud |
| 2010/0154054 | A1 | 6/2010 | Beck |

OTHER PUBLICATIONS

Gordon, Susan, "Database Integrity: Security, Reliability, and Performance Considerations"; Indiana University South Bend, South Bend, IN; 12 pp.

Herminghaus et al., "Storage Management in Data Centers—Chap. 11.3 Disk Outage in Detail"; http://books.google.com; 1 pg.

Nick et al., "S/390 cluster technology: Parallel Sysplex"; http://researchweb.watson.ibm.com/journals/sj/362/nick.pdf; 33 pp.

Vogels et al., "The Design and Architecture of the Microsoft Cluster Service"; Published in the Proceedings ofFTCS'98, Jun. 23-25, 1998, Munich, Germany; IEEE; 11 pp.

Kronenberg et al., "VAXclustersr: A Closely-Coupled Distributed System"; Dept. of Computer Science, University of Washington, Seattle, WA; 1986 ACM 0734-0261; 17 pp.

Singh, Kamal; CS article—Nov. 16, 2005; http://www.cs.sjsu.edu/faculty/stamp/CS249/projects/Chapter14.pdf; 54 pp.

U.S. Appl. No. 12/957,980 entitled "Propagation of Unique Device Names in a Cluster System" Non-final office action dated Nov. 19, 2012, 13 pg.

International Business Machines Corporation; Int'l Appln. No. PCT/EP2011/071367; International Search Report and Written Opinion dated May 15, 2012, 11 pg.

Ghemawat, et al. "The Google File System"; SOSP '03, Oct. 19-22, 2003, Bolton Landing, NY.; 15 pp.

Gordon, Susan. "Database Integrity: Security, Reliability, and Performance Consideration"; Indiana University South Bend, South Bend, IN; 12 pg.

Herminghaus, et al., "Storage Management in Data Centers—Chap. 11.3 Disk Outage in Detail"; http//books.google.com; 1 pg.

Nick, et al., "S/390 cluster technology: Parallel Sysplex"; http://researchweb.watson.ibm.com/journals/sj/362/nick.pdf; 33 pg.

Vogels, et al., "The Design and Architecture of the Microsoft Cluser Service"; Published in the Proceedings of FTCS'98, Jun. 23-25, 1998, Munich, Germany; IEEE; 11 pg.

Kronenberg et al., "VAXclusters: A Closely-Coupled Distributed System"; Dept. of Computer Science, University of Washington, Seattle, WA; 1986 ACM 0734-0261; 17 pg.

Singh, Kamal, CS article—Nov. 16, 2005; http://www/cs/sjsu.edu/faculty/stamp/CS249/projects/Chapter14.pdf; 54 pg.

International Business Machines Corporation; Int'l Appln. No. PCT/EP2011/071309; International Search Report and Written Opinion dated Mar. 14, 2012, 13 pg.

U.S. Appl. No. 12/957,980 entitled "Propagation of Unique Device Names in a Cluster System"; Non-final office action dated Aug. 1, 2013 (15 pg).

U.S. Appl. No. 12/957,894 entitled "Self-Assignment of Node Identifier in a Cluster System"; Non-final office action dated Aug. 15, 2013 (11 pg).

U.S. Appl. No. 12/957,894 entitled "Self-Assignment of Node Identifier in a Cluster System"; Non-final office action dated Feb. 6, 2013 (16 pg).

U.S. Appl. No. 13/456,388 entitled "Validation of Access to a Shared Data Record Subject to Read and Write Access by Multiple Requesters"; Final office action dated Jun. 13, 2013 (16 pg).

U.S. Appl. No. 13/456,388 entitled "Validation of Access to a Shared Data Record Subject to Read and Write Access by Multiple Requesters"; Non-final office action dated Feb. 6, 2013 (16 pg).

U.S. Appl. No. 12/957,937 entitled "Validation of Access to a Shared Data Record Subject to Read and Write Access by Multiple Requesters"; Non-final office action dated Feb. 6, 2013 (32 pg).

U.S. Appl. No. 12/957,937 entitled "Validation of Access to a Shared Data Record Subject to Read and Write Access by Multiple Requesters"; Final office action dated Jun. 13, 2013 (17 pg).

U.S. Appl. No. 12/957,980 entitled "Propagation of Unique Device Names in a Cluster System"; Final office action dated Jun. 17, 2013 (16 pg).

* cited by examiner

NOTIFICATION OF CONFIGURATION UPDATES IN A CLUSTER SYSTEM

CROSS-REFERENCE TO RELATED APPLICATIONS

The present application is related to the following commonly owned copending patent applications, which are filed on even date herewith and are incorporated herein by reference:
(1) U.S. patent application Ser. No. 12/957,894;
(2) U.S. patent application Ser. No. 12/957,937; and
(3) U.S. patent application Ser. No. 12/957,980;

BACKGROUND OF THE INVENTION

1. Technical Field

The present invention relates in general to data processing, and in particular, to cluster data processing systems.

2. Description of the Related Art

A cluster system, also referred to as a cluster multiprocessor system (CMP) or simply as a "cluster," is a set of networked data processing systems (or "nodes") with hardware and software shared among those data processing systems, typically (but not necessarily) configured to provide highly available and highly scalable application services. Cluster systems are frequently implemented to achieve high availability as an alternative to fault tolerance for mission-critical applications such as data centers, aircraft control, and the like. Fault tolerant data processing systems rely on specialized hardware to detect hardware faults and to switch to a redundant hardware component, regardless of whether the component is a processor, memory board, hard disk drive, adapter, power supply, etc. While providing seamless cutover and uninterrupted performance, fault tolerant systems are expensive due to the requirement of redundant hardware, and fail to address software errors, a more common source of data processing system failure.

High availability can be achieved in a cluster implemented with standard hardware through the use of software that permits resources to be shared system wide. When a node, component, or application fails, the software quickly establishes an alternative path to the desired resource. The brief interruption required to reestablish availability of the desired resource is acceptable in many situations. The hardware costs are significantly less than fault tolerant systems, and backup facilities may be utilized during normal operation.

Cluster system management is a special class of the general system management, with additional resource dependency and management policy constraints. In particular, the maintenance of cluster configuration information required for cluster system management poses a special problem. The cluster configuration information required for system management is typically stored in a database, which is either centralized or replicated to more than one data processing system for high availability. If centralized, the data processing system which manages a centralized cluster configuration database becomes a potential bottleneck and a single point of failure.

To avoid the problems of a centralized cluster configuration database, the cluster configuration database may be replicated and maintained on a number of data processing systems within the cluster. In a small cluster, the system configuration and status information may be readily replicated to all data processing systems in the cluster for use by each data processing system in performing system management functions such as failure recovery and load balancing. Full replication provides a highly available cluster configuration database and performs adequately as long as the cluster size remains small. In a very large cluster, however, the overhead associated with full replication of the cluster configuration database can be prohibitively high.

Another central issue in cluster system management is the handling of cluster partitions. Cluster partitions occur if nodes that can nominally be configured to operate in a cluster are partitioned into two or more sets of nodes that are not currently configured to share system resources. When a cluster partition occurs, for example, at system startup or in response to return of one or more downed nodes, errors can result if multiple copies of the same application, especially a database application such as the cluster configuration database, are run from these (temporarily) independent nodes of the cluster. A conventional way of managing cluster partitions is to require that a cluster remain offline until it reaches quorum. While the definition of quorum varies between implementations, in many implementations a majority quorum is employed, and a cluster is said to have reached quorum when the number of active nodes is at least N/2+1.

As nodes from a cluster partition become members of a cluster, the nodes must be assigned an identifier so that the nodes' software and hardware resources can be made available for access to the cluster. In a conventional cluster implementation, the identifiers are assigned by a central naming authority so that the identifiers can be guaranteed to be universally unique in the cluster. However, the use of a central naming authority can undesirably lead to a single point of failure, as well as the need for a node to modify its preexisting identifier upon joining the cluster.

SUMMARY OF THE INVENTION

In at least one embodiment, a second node receives a message from a first node in a cluster environment. The message includes a unique identifier of a shared data storage device including a cluster configuration database that defines membership of nodes in a cluster. In response to receiving the message, the second node attempts to find the shared data storage device. In response to finding the shared data storage device, the second node locates and reads the cluster configuration database on the shared data storage device. The second node then assimilates a cluster configuration update indicated by the cluster configuration database.

DETAILED DESCRIPTION OF ILLUSTRATIVE EMBODIMENT

Figure 1:
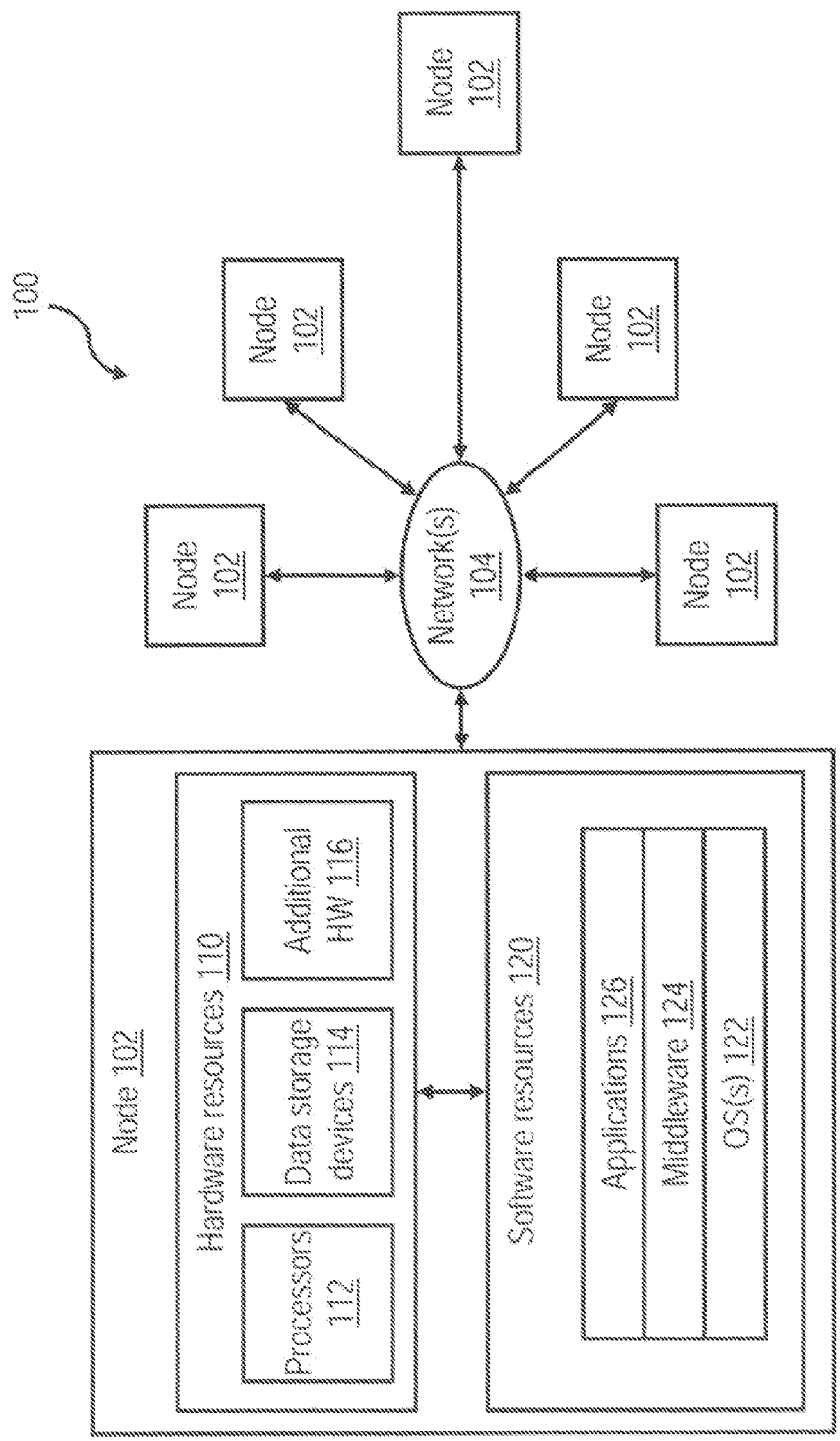
FIG. 1 is a high level block diagram of an exemplary data processing environment that may be configured as a cluster system in accordance with one embodiment.

With reference now to FIG. 1, there is illustrated a high level block diagram of a data processing environment that may be configured as a cluster system in accordance with one embodiment. In the depicted embodiment, data processing environment 100 includes a distributed collection of homogeneous or heterogeneous networked data processing systems, referred to herein as nodes 102. For example, each node 102 can be implemented with a server computer system, such as one of the POWER servers available from International Business Machines Corporation of Armonk, N.Y.

As shown, each node 102 includes both hardware resources 110 and software resources 120. Hardware resources 110 of nodes 102 include processors 112 for processing data and program instructions, as well as data storage devices 114 such as memory and optical and/or magnetic disks for storing software and data. Hardware resources 110 also include additional hardware 116, such as network, input/output (I/O) and peripheral adapters, power systems, ports, administrative consoles, attached devices, etc. In various embodiments, hardware resources 110 may include at least some redundant or backup resources that may be selectively placed into service, for example, in response to high workload or hardware failure.

The software resources 120 of a node 102 can include, for example, one or more possibly heterogeneous concurrent instances of operating system(s) 122, middleware 124 such as web and/or application servers, and applications 126. In a preferred embodiment, at least one of operating systems 122 includes built-in clustering capability supporting commands and programming APIs to enable creation, maintenance and management of a cluster from a group of operating system instances on multiple nodes 102. As described further below, the operating system infrastructure supports unique cluster-wide node and storage device naming across the cluster. In one preferred embodiment, this clustering capability is provided by cluster-aware AIX®, an open standards-based UNIX® operating system available from International Business Machines Corporation of Armonk, N.Y.

As further illustrated in FIG. 1, nodes 102 are coupled by one or more wired or wireless, public or private networks 104 to permit sharing of at least some of hardware resources 110 and software resources 120 among different nodes 102 configured to operate as a cluster. Network(s) 104 can include local area networks or wide area networks, such as the Internet, as well as private point-to-point connections between individual nodes 102.

One important function of the cluster support provide by operating system(s) 122 is to make shared cluster hardware and software resources highly available. As an example, if an individual node 102 within cluster system 100 fails, one or more applications 126 on the failed node 102 will be automatically migrated by operating system 122 to one or more other nodes 102 in the cluster system 100. Consequently, services provided by the failed node 102 will, after a brief interruption, be continuously available. For an application 126 or other resource to be highly available, multiple nodes 102 within the cluster are usually configured to run that application 126 or resource, although usually at most only one node 102 manages the shared application 126 at any single instant in time.

Those of ordinary skill in the art will appreciate that the hardware and software employed in a cluster system, such as the exemplary data processing environment depicted in FIG. 1, may vary. For example, a cluster system can additional or fewer nodes, one or more client systems, and/or other connections not explicitly shown. The generalized cluster architecture shown in FIG. 1 is not intended to imply an architectural limitations on the claimed invention.

Figure 2:
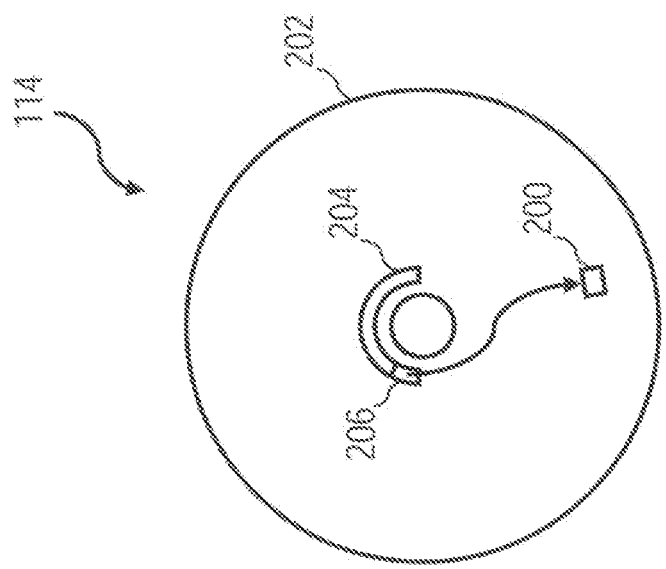
FIG. 2 depicts a trusted data storage device that stores a cluster configuration database in accordance with one embodiment.

To permit resource sharing between certain nodes 102 in data processing environment 100 while preventing unauthorized access to the shared resources by other nodes 102, clients or other devices, a cluster configuration database preferably defines what nodes 102 are authorized to form and/or join a cluster and thus access the shared resources of the cluster. In one preferred embodiment depicted in FIG. 2, the cluster configuration database 200 resides on a trusted shared data storage device 114 of a host node 102, represented in FIG. 2 by a hard disk 202. Cluster system 100 is constructed and configured such that trusted shared data storage device 114 is only accessible to nodes 102 that are authorized to be members of a cluster (whether or not the nodes 102 actually are members of the cluster at the time of access).

Hard disk 202 includes a boot sector 204 containing the information required to boot the host node 102 under one of operating systems 122. In accordance with a preferred embodiment, boot sector 204 includes a cluster field 206 containing a pointer to cluster configuration database 200, which as shown, preferably resides on the same trusted shared data storage device 114. At a minimum, cluster configuration database 200 identifies which nodes 102 are authorized to join a cluster and thus access shared cluster resources.

Figure 3:
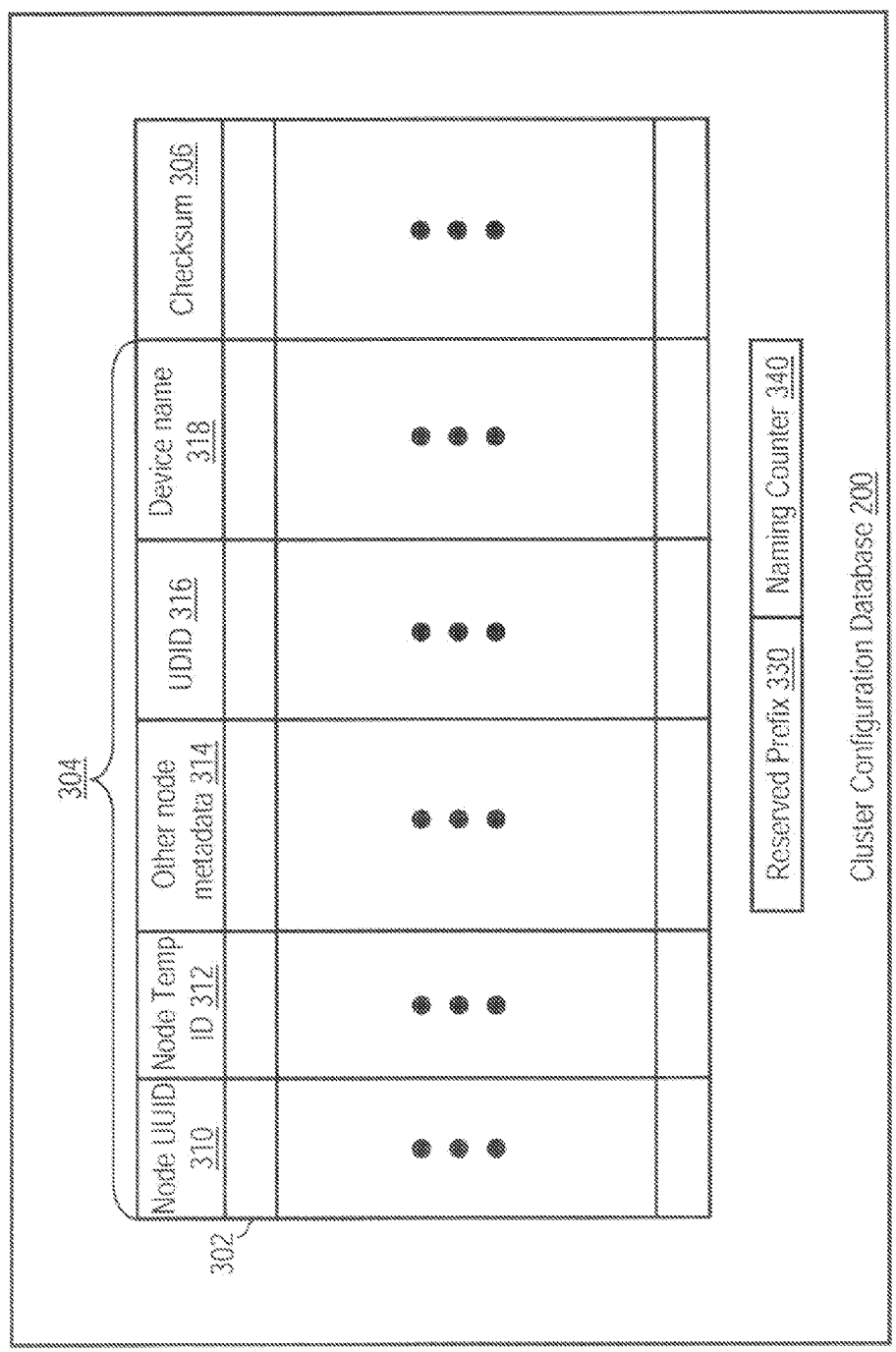
FIG. 3 illustrates an exemplary cluster configuration database in accordance with one embodiment.

With reference now to FIG. 3, there is illustrated an exemplary cluster configuration database 200 in accordance with one embodiment. In the depicted embodiment, cluster configuration database 200 includes a plurality of data records 302 each comprising a payload 304 and a checksum field 306 storing a checksum of the data record's payload 304.

The payload 304 of each data record 302 includes a node UUID (Universally Unique Identifier) field 310 for storing the UUID of a respective one of nodes 102. The UUID preferably is self-assigned by the node 102 in accordance with the process depicted in FIG. 5 and conforms to the format described, for example, in ISO/IEC 11578. Data record 302 additionally includes a node temporary ID field 312 that records a temporary identifier of the node 102, such as the hostname or Internet Protocol (IP) address assigned to the node 102. Data record 314 may optionally include one or more additional node metadata fields, shown generally at reference numeral 314, that hold additional metadata regarding the node 102.

As noted above, nodes 102 within a cluster defined by cluster configuration database 200 share software resources 120 and hardware resources 110, including at least some of data storage devices 114. The data storage device(s) 114 of a node 102 to be shared by other nodes 102 of a cluster are identified by Universal Disk Identifiers (UDIDs) (or UUIDs) recorded in UDID field 316 of data record 302. The UDID field 316 of a data record 302 is populated upon the addition of a host node 102 on which the shared data storage devices 114 reside to the cluster configuration.

Associated with UDID field 316 is a disk name field 318 that stores a corresponding device name for each of the shared data storage devices 114 referenced in UDID field 316. As will be appreciated, software, such as operating systems 114, traditionally reference data storage devices by a variety of names, such as the combination of major and minor numbers utilized by UNIX® to refer to disks. However, in a cluster environment, the migration of software and hardware resources between nodes 102 is hampered by use of inconsistent resource identifiers by different nodes 102 to identify the same resource. Accordingly, cluster configuration database 200 preferably includes support for the generation of unique names for shared data storage devices 114. In the depicted embodiment, this support includes a reserved prefix buffer 330 that holds a reserved prefix of the names of shared data storage devices 114. In addition, cluster configuration database 200 includes a naming counter 340 that monotonically advances (i.e., increments or decrements) to ensure a device name is never repeated during the lifetime of cluster configuration database 200.

Figure 4:
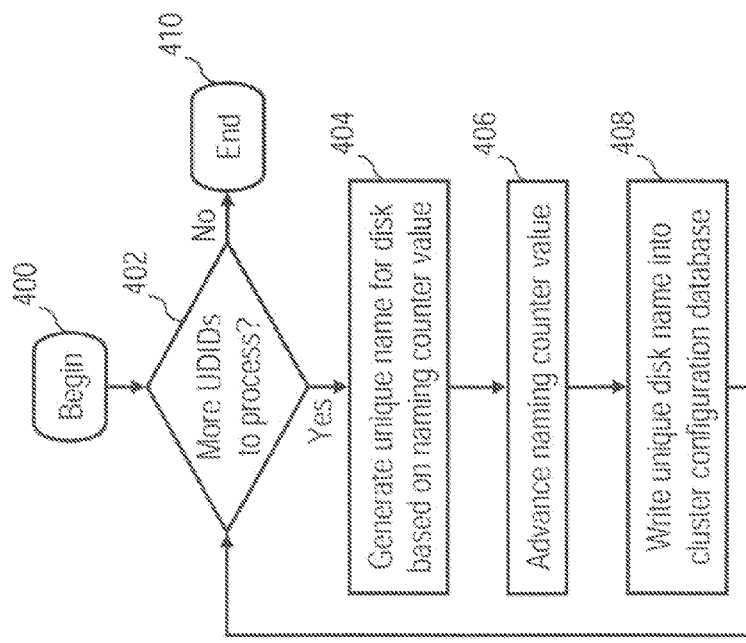
FIG. 4 is a high level logical flowchart of an exemplary process for generating unique names for cluster storage devices in accordance with one embodiment.

Thus, as shown in FIG. 4, in response to a cluster configuration operation by a node 102 that adds a shared data storage device 114 to the cluster configuration, as indicated by the insertion of the UDID (or UUID) of a new shared data storage device 114 in UDID field 316 of a data record 302, the software that initiates the cluster configuration operation (e.g., an operating system 122) preferably performs or invokes a process to generate unique device names for the shared data storage devices 114. In the exemplary process shown in FIG. 4, the process begins at block 400 and then proceeds to block 402, which illustrates a determination of whether any additional shared data storage devices (represented by their UDIDs) remain to be processed. If not, the process ends at block 410.

If, on the other hand, one or more new shared data storage devices 114 remain to processed, the software generates a device name for the new shared data storage device 114 at block 404 by concatenating the reserved prefix from reserved prefix buffer 330 with the value of naming counter 340, which is then advanced (i.e., incremented or decremented) as shown at block 406. The software then records the device name of the new shared data storage device 114 in device name field 318 in association with the UDID (or UUID) recorded in UDID field 316 (block 408). Following block 408, the process returns to block 402 to generate a device name for the next new shared data storage devices 114 to be processed, if any.

Figure 5:
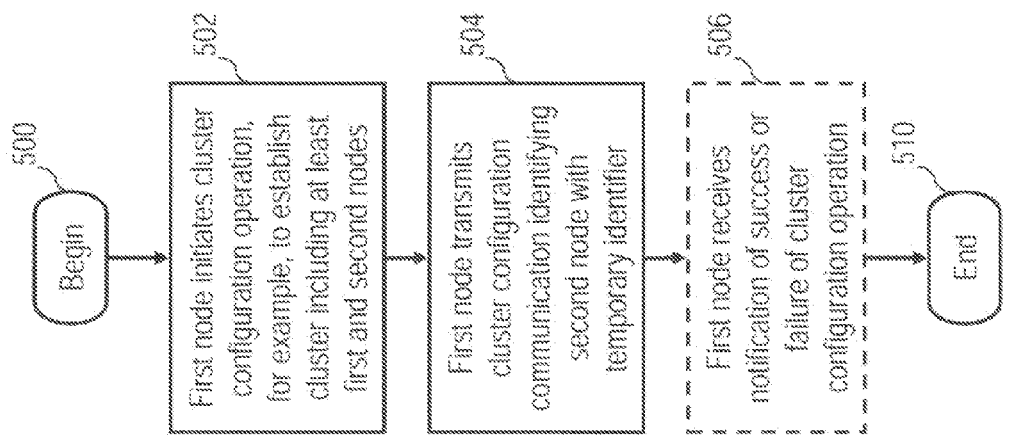
FIG. 5 is a high level logical flowchart of an exemplary process by which a first node initiates a cluster configuration change in a cluster including at least a second node in accordance with one embodiment.

With reference now to FIG. 5, there is illustrated a high level logical flowchart of an exemplary process by which a first node 102 initiates a cluster configuration change in a cluster including at least a second node in accordance with one embodiment. The exemplary process can be implemented, for example, by appropriate programming of a cluster-aware operating system 122 of the first node 102.

The process begins at block 500 and then proceeds to block 502, which depicts a first node 102 of data processing environment 100 initiating a cluster configuration operation, for example, to establish a cluster including at least itself and a second node 102 or to perform some other cluster update to the configuration of a running cluster. Thus, at the time first node 102 initiates the cluster configuration operation, first node 102 may or may not already be a member of the cluster. In addition, at block 504, first node 102 transmits on network 104 a cluster configuration communication identifying the second node 102 utilizing a temporary identifier, such as a hostname or IP address of the second node 102. The first node 102 may determine one or more recipient nodes 102 of the cluster configuration communication, for example, from the cluster configuration defined by cluster configuration database 200. In one embodiment, the cluster configuration communication, which may be a unicast or multicast message, simply identifies second node 102 by the temporary identifier and provides information regarding the location of cluster configuration database 200, for example, a unique identifier (e.g., UDID) of the trusted shared data storage device 114 (e.g., hard disk 202 of FIG. 2). In this manner, second node 102 is notified to access cluster configuration database 200 without explicit transmission of cluster configuration data, and the inherent security provided by trusted shared data storage device 114 prevents unauthorized devices from accessing or receiving sensitive cluster configuration data.

As shown at block 506, first node 102 may thereafter optionally receive notification of the success or failure of the cluster configuration operation, for example, from second node 102. First node 102 can receive the notification, for example, in a message received via network(s) 104 or in a message communicated via trusted shared storage device 114. Thereafter, the process depicted in FIG. 5 ends at block 510.

Figure 6:
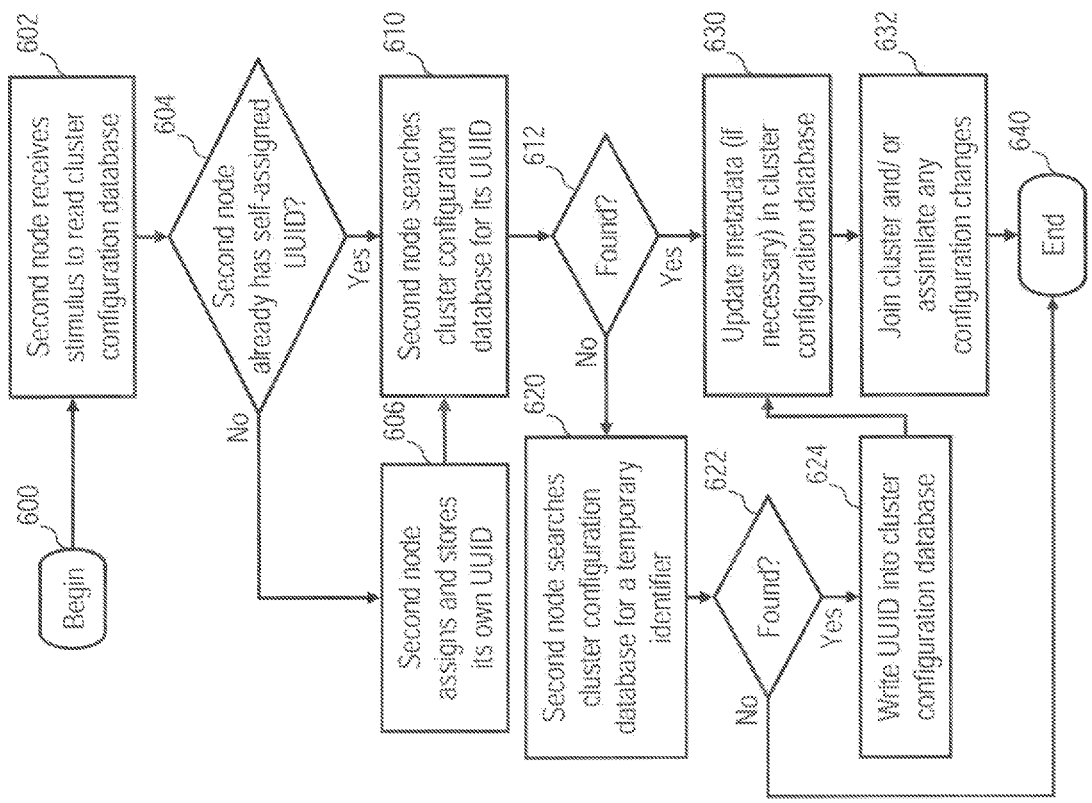
FIG. 6 is a high level logical flowchart of an exemplary process by which a second node promulgates its self-assigned UUID (Universally Unique Identifier) to a cluster in accordance with one embodiment.

Referring now to FIG. 6, there is depicted a high level logical flowchart of an exemplary process by which a second node promulgates its self-assigned UUID to a cluster in accordance with one embodiment. The exemplary process can be implemented, for example, by appropriate programming of a cluster-aware operating system 122 of the second node 102.

The process shown in FIG. 6 begins at block 600 and then proceeds to block 602, which depicts the second node 102 receiving a stimulus to read cluster configuration database 200. In one embodiment, described previously with reference to block 504 of FIG. 5, the stimulus is a message from the first node 102 received via network(s) 104. In other operating scenarios, second node 102 may alternatively or additionally be configured (e.g., via appropriate programming of an operating system 122) to read cluster configuration database 200 at intervals or in response to predetermined events, such as system startup.

In response to receiving a stimulus to read cluster configuration database 200, second node 102 determines at block 604 whether or not it already has a self-assigned UUID. In making the determination depicted at block 604, second node 102 may, for example, access a storage location in one of its local data storage devices 114 predetermined by software and/or firmware. If second node 114 determines at block 604 that the second node 102 already has a self-assigned UUID, the process passes to block 410, which is described below. If, on the other hand, second node 102 determines at block 604 that is does not already have a self-assigned UUID, second node 102 generates and stores its UUID. Second node 102 can use any known or future developed technique to generate, store and retrieve its UUID, provided that the self-assigned UUID is persistent across reboots of second node 102. As is well known in the art, a UUID can be generated, for example, by random number generation or utilizing a SHA-1 or MD6 hash. Following block 606, the process passes to block 610.

Block 610 depicts second node 102 accessing and searching cluster configuration database 200 in trusted shared data storage device 114 for its self-assigned UUID. Second node 102 can locate cluster configuration database 200, for example, utilizing the unique identifier received in the cluster configuration communication described at block 504 of FIG. 5 and by then locating boot sector 204 of trusted shared data storage device 114 and following the pointer provided in cluster field 206. If second node 102 finds its self-assigned UUID in cluster configuration database 200 (e.g., in node UUID field 310 of a data record 302), second node 102 knows that it has previously been a member of the cluster. Accordingly, the process proceeds from block 612 to block 630, which is described below. Otherwise, the process passes block 612 to block 620, which illustrates second node 102 searching cluster configuration database 200 (e.g., in node temporary ID field 312) for a temporary identifier associated with second node 102, such as a hostname or IP address of second node 102. The temporary identifier may further be associated in cluster configuration database 200 with a constant or well-known UUID to indicate that the self-assigned UUID of second node 102 is not yet known to the cluster.

If second node 102 determines at block 622 that a temporary identifier of second node 102 is not present in cluster configuration database 200, second node 200 determines that it is not a member of the cluster and terminates the cluster configuration process shown in FIG. 6 at block 640. The termination may be "silent" and provide no notification to first node 102; alternatively, second node 102 may provide a failure notification to first node 102 via trusted shared data storage device 114 or via a message transmitted over network(s) 104.

Returning to block 622, in response to second node 102 determining that a temporary identifier of second node 102 is present in cluster configuration database 200, second node 102 knows that this is its first time to join the cluster. Accordingly, second node 102 writes its self-assigned UUID into cluster configuration database 102 (e.g., in node UUID field 310 of its data record 302), as shown at block 424. In addition, second node 102 may supply or update additional metadata describing second node 102 (e.g., in node temporary ID field 312 or node metadata field 314 of its data record 302), as depicted at block 630. Second node 102 then proceeds to join the cluster and/or assimilate any configuration changes to the cluster since it last read cluster configuration database 200, as depicted at block 632. As discussed further below with reference to FIG. 9, the activities performed by second node 102 in joining the cluster may include updating its internal configuration with the device names assigned to its shared storage devices 114 by cluster configuration database 200 and/or starting cluster services. With the self-assigned QUID of second node 102 present in cluster configuration database 200, the various nodes 102 belonging to the cluster can then access hardware resources 110 and software resources 120 of second node 102 and perform cluster configuration operations referencing second node 102 utilizing its self-assigned UUID.

As previously noted, second node 102 may optionally provide notification of joining the cluster to first node 102, for example, via trusted shared data storage device 114 or by transmitting a notification message via network(s) 114. Thereafter, the process depicted in FIG. 6 ends at block 640.

The preceding discussion has described access to cluster configuration database 200 by a first node 102 and a second node 102. However, because cluster configuration database 200 is itself a shared resource of the cluster, cluster configuration database 200 may potentially be contemporaneously accessed not only by first node 102 and second node 102, but also by numerous additional nodes 102 of data processing environment 100. To ensure integrity of the data records 302 of cluster configuration database 200 in the presence of contemporaneous access by multiple nodes 200, access to cluster configuration database 200 is preferably coordinated between nodes utilizing an agreed protocol.

In many environments supporting concurrent access to shared data records, coordination between requesters accessing the shared data records is implemented by middleware, such as database software, or the network protocols by which the requesters access the shared data records. However, in the case of cluster configuration database 200, the infrastructure on which such coordination relies (e.g., software or communication protocols) may not be available when a node 102 accesses cluster configuration database 102, for example, early in the boot process of that node 102.

Figure 7:
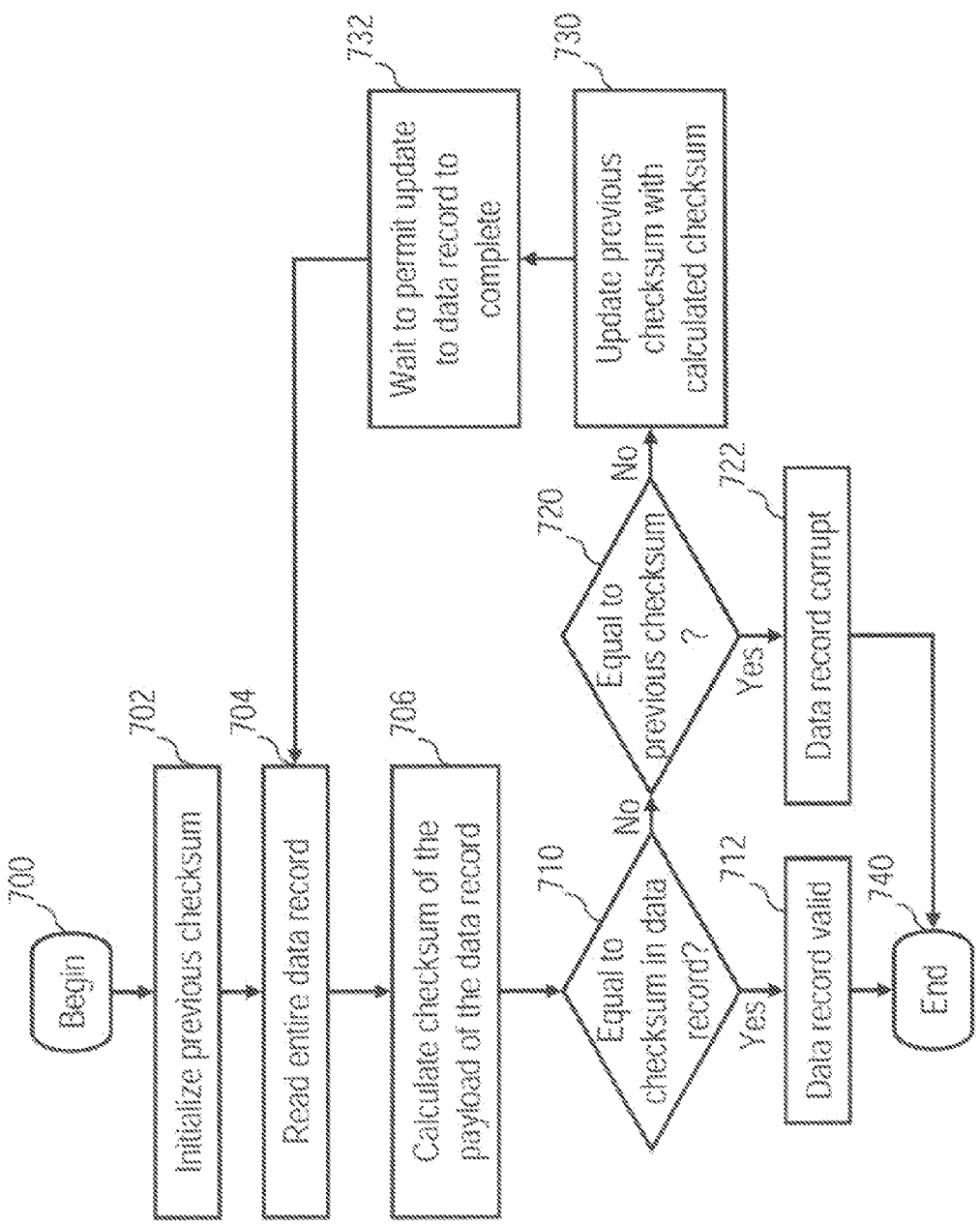
FIG. 7 is a high level logical flowchart of an exemplary process for reading a shared data record, such as a record of a cluster configuration database, in accordance with one embodiment.
Figure 8:
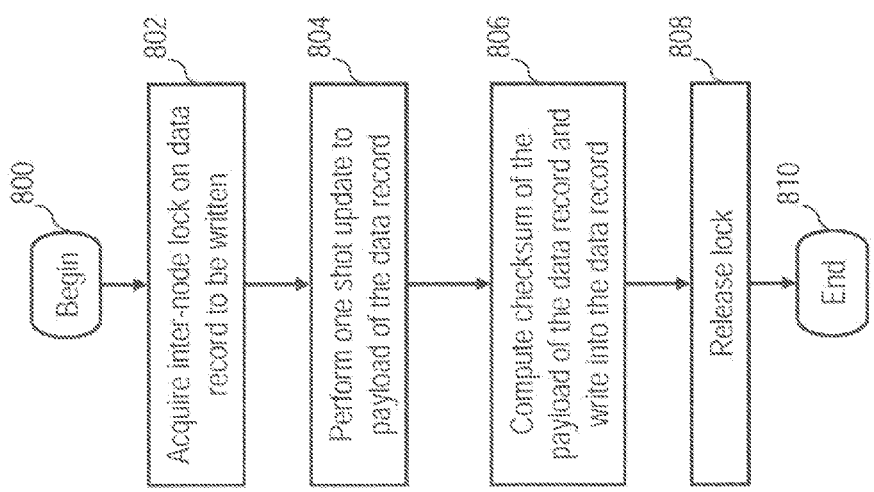
FIG. 8 is a high level logical flowchart of an exemplary process for writing a shared data record, such as a record of a cluster configuration database, in accordance with one embodiment.

Accordingly, access by multiple nodes 102 to cluster configuration database 200, and more broadly, access by multiple requesters to shared data records, can be effectively coordinated without recourse to higher level software and communication protocols as illustrated in FIGS. 7 and 8. Referring first to FIG. 7, there is depicted a high level logical flowchart of an exemplary process for reading a shared data record, such as a record of a cluster configuration database, in accordance with one embodiment. In the following description, the illustrated process is described as being implemented by an operating system 122 of a node 102 reading cluster configuration database 200, but it should be understood that the illustrated process is not limited to such embodiments and may generally be performed by any software or hardware that coordinates read access to shared data records between multiple requesters.

The illustrated process begins at block 700 and then proceeds to block 702, which depicts operating system 122 initializing a temporary variable referred to as "previous checksum" to an initial value, such as zero, that is not a valid checksum value. At block 704, the operating system 122 reads a data record 302 of cluster configuration database 200 into memory in one shot (but not necessarily atomically). This read, which includes both the payload 304 and checksum field 306 of the data record 302, may be performed, for example, during the steps illustrated at blocks 610 and 620 of FIG. 6. Operating system 122 then calculates the checksum of payload 304 of data record 302 (block 706) and compares the calculated checksum with the contents of checksum field 306 read from cluster configuration database 200 (block 710). In response to a determination at block 710 that the calculated checksum matches the checksum read from cluster configuration database 200, the data record 302 is valid and up-to-date. Consequently, the process depicted in FIG. 7 returns a "success" (e.g., in a return code) and ends at block 740. Thus, the calling process that initiated the read of cluster configuration database 200 can proceed knowing that the accessed contents of cluster configuration database 200 are valid.

Returning to block 710, if the calculated checksum does not match the checksum read from cluster configuration database 200, then two possibilities exist: (1) the data record 302 is in the process of being updated or (2) data record 302 is corrupt. To differentiate these cases, operating system 122 determines at block 720 whether or not the calculated checksum is equal to the previous checksum variable. If not, the process passes to block 730, which depicts operating system 122 updating the previous checksum variable with the checksum calculated at block 706. Operating system 122 then waits at block 732 for an appropriate amount of time to permit any ongoing update to the data record 302 to complete. The process then returns to block 704-710, which represent operating system 122 again reading the target data record 302 and calculating a checksum for its payload 304.

If the calculated checksum now matches the value of checksum field 306 at block 710, then the update of data record 302 has completed, and the data record 302 is validated as previously described. If, however, the calculated checksum does not equal the value of checksum field 306, operating system 122 again determines at block 720 whether or not the calculated checksum is equal to the previous checksum recorded at block 730. If not, then the update to the data record 302 is ongoing, and the process iterates as previously described. If, however, operating system 122 determines at block 720 that the calculated checksum matches the previous checksum, then data record 302 is not the target of an ongoing update and is instead corrupted, as indicated at block 722. Consequently, the process illustrated in FIG. 7 ends at block 740 with a failure notification, which is handled by the calling process in an implementation-dependent manner.

As should be appreciated, the process for reading a shared data record depicted in FIG. 7 permits validation of the a shared data record accessed by a requester without the mutual exclusion (mutex) locking or other similar infrastructure commonly used to synchronize access to shared data records.

Referring now to FIG. 8, there is depicted a high level logical flowchart of an exemplary process for writing a shared data record, such as a record of cluster configuration database 200, in accordance with one embodiment. The following description again describes the illustrated process as being implemented by an operating system 122 of a node 102 writing a data record 302 in cluster configuration database 200, for example, at block 624 of FIG. 6. It should be understood, however, that the illustrated process is not limited to such embodiments and may generally be performed by any software or hardware that coordinates write access to shared data records between multiple requesters.

The illustrated process begins at block 800 and then proceeds to block 802, which depicts operating system 122 of a node 102 seeking to write a data record 302 of cluster configuration database 200 acquiring an inter-node lock on the target data record 302 to be written. The inter-node lock may be obtained, for example, utilizing an inter-node advisory locking methodology, such as the Ricart-Agrawala algorithm or the like. In response to acquisition of the inter-node lock on the target data record 302, operating system 122 performs a one-shot (but not necessarily atomic) update to payload 304 of the target data record 302 (block 804). Operating system 122 additionally computes the checksum of payload 304 and writes the computed checksum into checksum field 306 of the target data record 302 (block 806). Operating system 122 thereafter releases the inter-node lock on the target data record 302, as depicted at block 808. The process shown in FIG. 8 then terminates at block 810.

Figure 9:
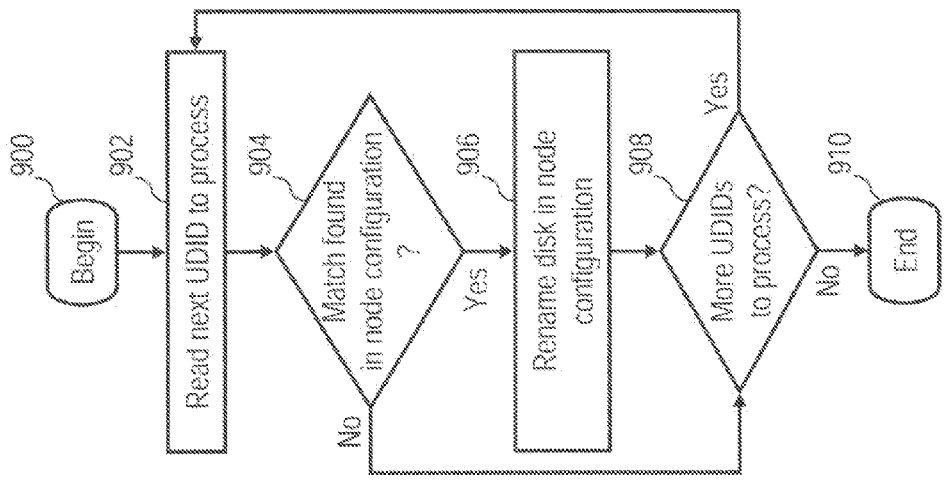
FIG. 9 is a high level logical flowchart of an exemplary process for configuring nodes of a cluster with common device names for shared data storage devices in accordance with one embodiment.

With reference now to FIG. 9, there is illustrated a high level logical flowchart of an exemplary process for configuring nodes of a cluster with common device names for shared data storage devices in accordance with one embodiment. In one embodiment, the depicted process is performed by an operating system 122 of a node 102 at block 632 of FIG. 6 as a part of the boot process.

The process shown in FIG. 9 begins at block 900, for example, during the boot process of a node 102, and then proceeds to block 902. Block 902 depicts an operating system 122 of the node 102 reading cluster configuration database 200 to determine a next UDID (or UUID) to be processed (and preferably validating the associated data record 302 utilizing the process illustrated in FIG. 7). Operating system 122 then determines if a UDID (or UUID) matching that read from cluster configuration database 200 is found in the node configuration maintained internally in the booting node 102. If not, the process passes to block 908, which is described below.

If, however, a matching UDID (or UUID) is found in the node configuration, operating system 122 renames the shared data storage device 114 in the node configuration maintained at the booting node 102 to the device name associated with the UDID in device name field 318 (block 906). Operating system 122 determines at block 908 if cluster configuration database 200 contains additional UDIDs to be processed. If not, the process depicted in FIG. 9 ends at block 910. If, however, operating system 122 determines at block 908 that one or UDIDs remain to be processed, the process shown in FIG. 9 returns to block 902, which has been described. Thus, in accordance with the illustrated process, nodes 102 belonging to a cluster rename shared storage devices such that the shared storage devices have common names across all nodes 102 of the cluster.

As has been described, in at least one embodiment, in response to a stimulus indicating configuration of a node into a cluster of a plurality of nodes including the node, the node determines whether or not the node has a universally unique identifier (UUID), and if not, the node provides its own persistent self-assigned UUID. The node searches a cluster configuration database for a temporary identifier associated with the node. In response to the node locating the temporary identifier of the node in the cluster configuration database, the node writes its self-assigned UUID into the cluster configuration database and joins the cluster.

According to another aspect, a unique device name is assigned to each of a plurality of shared storage devices in a cluster configuration database defining membership of nodes in a cluster. A particular node among the nodes defined by the cluster configuration database as a member of the cluster searches the cluster configuration database for a device identifier matching a device identifier of a shared storage device hosted by the particular node. In response to finding a matching device identifier in the cluster configuration database, the particular node renames, in a local configuration maintained at the particular node, a storage device associated with the matching device identifier with the unique name assigned to that storage device in the cluster configuration database.

According to yet another aspect, in a method of access to a shared data record subject to contemporaneous read and write access by multiple requesters, a requester reads a shared data record including a payload and a first checksum. The requester calculates a second checksum of the payload of the data record. If the first and second checksums are not equal, the requester again reads the shared data record, including a third checksum, and calculates a fourth checksum of the payload of the shared data record. If the third and fourth checksums are equal, the requester processes the shared data record as valid, and if the second and fourth checksums are equal, the requester handles the shared data record as corrupt.

According to yet another aspect, a second node receives a message from a first node in a cluster environment. The message includes a unique identifier of a shared data storage device including a cluster configuration database that defines membership of nodes in a cluster. In response to receiving the message, the second node attempts to find the shared data storage device. In response to finding the shared data storage device, the second node locates and reads the cluster configuration database on the shared data storage device. The second node then assimilates a cluster configuration update indicated by the cluster configuration database.

In each of the flowcharts above, one or more of the methods may be embodied in a computer-readable medium containing computer-readable code such that a series of steps are performed when the computer-readable code is executed on a computing device. In some implementations, certain steps of the methods are combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence of steps is therefore, not to be taken in a limiting sense, and the scope of the present invention is defined only by the appended claims.

It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

Thus, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer readable program code embodied thereon.

Any combination of one or more computer-readable medium(s) may be utilized. The computer-readable medium may be a computer readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing. Computer program code for carrying out operations for aspects of the present invention may be written in any combination of one or more programming languages, including an object-oriented programming language such as Java, Smalltalk, C++ or the like and conventional procedural programming languages, such as the C programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the program code (whether software or firmware) will typically be stored in one or more machine-readable storage mediums, such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage systems containing or having network access to program(s) coded in accordance with the invention.

Thus, it is important that while an illustrative embodiment of the present invention is described in the context of a fully functional computer (e.g., server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method of data processing in a cluster system, comprising:
    a second node receiving a message from a first node in a cluster environment, the message including a unique identifier of a shared data storage device including a cluster configuration database that defines membership of nodes in a cluster;
    in response to receiving the message:
        the second node attempting to find the shared data storage device;
        in response to finding the shared data storage device, the second node locating and reading the cluster configuration database on the shared data storage device; and
        the second node assimilating a cluster configuration update indicated by the cluster configuration database.

2. The method of claim 1, and further comprising:
    in response to the second node failing to locate the shared data storage device, the second node ignoring the message.

3. The method of claim 1, wherein the reading includes validating the cluster configuration database.

4. The method of claim 1, wherein the locating comprises reading a boot record and determining a storage location of the cluster configuration database from the boot record.

5. The method of claim 1, wherein the assimilating comprises the second node joining the cluster and the second node starting cluster services.

6. The method of claim 1, wherein the message does not specify cluster configuration data.

7. A program product comprising:
    a computer-readable storage device; and
    program code stored within the computer-readable storage device that, when executed by a processing node, causes the processing node to perform:
        receiving a message from another node in a cluster environment, the message including a unique identifier of a shared data storage device including a cluster configuration database that defines membership of nodes in a cluster;
        in response to receiving the message:
            attempting to find the shared data storage device;
            in response to finding the shared data storage device, locating and reading the cluster configuration database on the shared data storage device; and
            assimilating a cluster configuration update indicated by the cluster configuration database.

8. The program product of claim 7, wherein the program code further causes the processing node to perform:
    in response to the second node failing to locate the shared data storage device, ignoring the message.

9. The program product of claim 7, wherein the reading includes validating the cluster configuration database.

10. The program product of claim 7, wherein the locating comprises reading a boot record and determining a storage location of the cluster configuration database from the boot record.

11. The program product of claim 7, wherein the assimilating comprises the processing node joining the cluster and the processing node starting cluster services.

12. The program product of claim 7, wherein the message does not specify cluster configuration data.

13. A processing node comprising:
    a processor;
    data storage coupled to the processor; and
    program code within the data storage that, when executed by the processor, causes the processing node to perform:
        receiving a message from another node in a cluster environment, the message including a unique identifier of a shared data storage device including a cluster configuration database that defines membership of nodes in a cluster;
        in response to receiving the message:
            attempting to find the shared data storage device;
            in response to finding the shared data storage device, locating and reading the cluster configuration database on the shared data storage device; and
            assimilating a cluster configuration update indicated by the cluster configuration database.

14. The data processing system of claim 13, wherein the program code further causes the processing node to perform:
    in response to the second node failing to locate the shared data storage device, ignoring the message.

15. The data processing system of claim 13, wherein the reading includes validating the cluster configuration database.

16. The data processing system of claim 13, wherein the locating comprises reading a boot record and determining a storage location of the cluster configuration database from the boot record.

17. The data processing system of claim 13, wherein the assimilating comprises the processing node joining the cluster and the processing node starting cluster services.

18. The data processing system of claim 13, wherein the message does not specify cluster configuration data.

* * * * *